US007542970B2

(12) United States Patent
Holmes et al.

(10) Patent No.: US 7,542,970 B2
(45) Date of Patent: Jun. 2, 2009

(54) SYSTEM AND METHOD FOR SELECTING A SUB-DOMAIN FOR A SPECIFIED DOMAIN OF THE WEB

(75) Inventors: Scott Richard Holmes, Morgan Hill, CA (US); Hongcheng Mi, Sunnyvale, CA (US); Sumit Negi, New Delhi (IN); Zengyan Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/432,265

(22) Filed: May 11, 2006

(65) Prior Publication Data

US 2007/0266016 A1 Nov. 15, 2007

(51) Int. Cl.
  *G06F 7/00* (2006.01)
  *G06F 17/30* (2006.01)
(52) U.S. Cl. .................. 707/4; 707/2; 707/3; 707/5
(58) Field of Classification Search .............. 707/2, 707/4, 3, 5
  See application file for complete search history.

(56) References Cited

U.S. PATENT DOCUMENTS 5,787,417 A * 7/1998 Hargrove ................. 707/4
6,421,675 B1 * 7/2002 Ryan et al. ............... 707/100
6,446,061 B1 9/2002 Doerre et al.
6,523,019 B1 * 2/2003 Borthwick ................ 706/45
6,594,694 B1 * 7/2003 Najork et al. ............. 709/219
6,654,735 B1 11/2003 Eichstaedt et al.
6,711,585 B1 3/2004 Copperman et al.
6,832,218 B1 * 12/2004 Emens et al. .............. 707/3
7,117,207 B1 * 10/2006 Kerschberg et al. ........ 707/5
2004/0088647 A1 * 5/2004 Miller et al. .............. 715/500
2005/0165753 A1 * 7/2005 Chen et al. ............... 707/3
2006/0080603 A1 * 4/2006 Bailey et al. .............. 715/530

* cited by examiner

Primary Examiner—Hung Q Pham
Assistant Examiner—Marc Somers
(74) Attorney, Agent, or Firm—Schmeiser, Olsen & Watts

(57) ABSTRACT

A selection system and method. The selection method comprises receiving, by a computing system, a taxonomy of data related to a specified domain of knowledge on the web. A taxonomy tree is constructed from the taxonomy. A sub tree related to a sub-domain from specified domain is selected from the taxonomy tree. A first list comprising user expected universal resource locators (URLs) related to the sub-domain is received. A second list comprising topic expressions defining each node of the taxonomy sub-tree is generated. A query based on the second list is generated. The query is applied on an index of URLs generated from a web crawling process to generate a third list. A recall value is calculated based on the first list and the third list.

9 Claims, 3 Drawing Sheets

SYSTEM AND METHOD FOR SELECTING A SUB-DOMAIN FOR A SPECIFIED DOMAIN OF THE WEB

BACKGROUND OF THE INVENTION

1. Technical Field

The present invention relates to a system and associated method for selecting a subset of the web for a specified domain.

2. Related Art

Locating specific information on a network may be inefficient and very time consuming. Therefore there exists a need for an efficient method for locating specific information on a network.

SUMMARY OF THE INVENTION

The present invention provides a selection method, comprising:

receiving, by a computing system, a taxonomy of data related to a specified domain of knowledge on the web;

storing, by said computing system, said taxonomy of data;

constructing, by a software application within said computing system, a taxonomy tree from said taxonomy;

receiving, by said computing system, a user selection for a taxonomy sub-tree from said taxonomy tree, said sub tree related to a sub-domain from said specified domain;

receiving, by said computing system, a first list comprising user expected universal resource locators (URLs) related to said sub-domain;

generating, by said software application, a second list comprising topic expressions defining each node of said taxonomy sub-tree;

generating, by said software application, a query based on said second list by applying at least one Boolean operator on said topic expressions on said second list;

applying, by said software application, said query on an index of URLs, said index generated from a web crawling process;

generating, by said query, a third list comprising actual URLs located during said query;

determining, by said software application, a first group (A) of URLs that are listed on and common to said third list and said first list determining, by said software application, a second group (B) of URLs that are listed on only said first list;

calculating, by said software application, a recall value (R) based on a number of URLs in said first group ($N_A$) and a number of URLs in said second group ($N_B$).

The present invention provides a computing system comprising a processor coupled to a computer-readable memory unit, said memory unit comprising a software application and instructions that when executed by the processor implement a selection method, said method comprising:

receiving, by said computing system, a taxonomy of data related to a specified domain of knowledge on the web;

storing, by said computing system, said taxonomy of data;

constructing, by a software application within said computing system, a taxonomy tree from said taxonomy;

receiving, by said computing system, a user selection for a taxonomy sub-tree from said taxonomy tree, said sub tree related to a sub-domain from said specified domain;

receiving, by said computing system, a first list comprising user expected universal resource locators (URLs) related to said sub-domain;

generating, by said software application, a second list comprising topic expressions defining each node of said taxonomy sub-tree;

generating, by said software application, a query based on said second list by applying at least one Boolean operator on said topic expressions on said second list;

applying, by said software application, said query on an index of URLs, said index generated from a web crawling process;

generating, by said query, a third list comprising actual URLs located during said query;

determining, by said software application, a first group (A) of URLs that are listed on and common to said third list and said first list determining, by said software application, a second group (B) of URLs that are listed on only said first list;

calculating, by said software application, a recall value (R) based on a number of URLs in said first group ($N_A$) and a number of URLs in said second group ($N_B$).

The present invention provides a computer program product, comprising a computer usable medium including a software application and computer readable program code embodied therein, said computer readable program code comprising an algorithm adapted to implement a selection method within a computing system, said method comprising:

receiving, by said computing system, a taxonomy of data related to a specified domain of knowledge on the web;

storing, by said computing system, said taxonomy of data;

constructing, by a software application within said computing system, a taxonomy tree from said taxonomy;

receiving, by said computing system, a user selection for a taxonomy sub-tree from said taxonomy tree, said sub tree related to a sub-domain from said specified domain;

receiving, by said computing system, a first list comprising user expected universal resource locators (URLs) related to said sub-domain;

generating, by said software application, a second list comprising topic expressions defining each node of said taxonomy sub-tree;

generating, by said software application, a query based on said second list by applying at least one Boolean operator on said topic expressions on said second list;

applying, by said software application, said query on an index of URLs, said index generated from a web crawling process;

generating, by said query, a third list comprising actual URLs located during said query;

determining, by said software application, a first group (A) of URLs that are listed on and common to said third list and said first list determining, by said software application, a second group (B) of URLs that are listed on only said first list;

calculating, by said software application, a recall value (R) based on a number of URLs in said first group ($N_A$) and a number of URLs in said second group ($N_B$).

The present invention advantageously provides a system and associated method for locating specific information on a network.

DETAILED DESCRIPTION OF THE INVENTION

Figure 1:
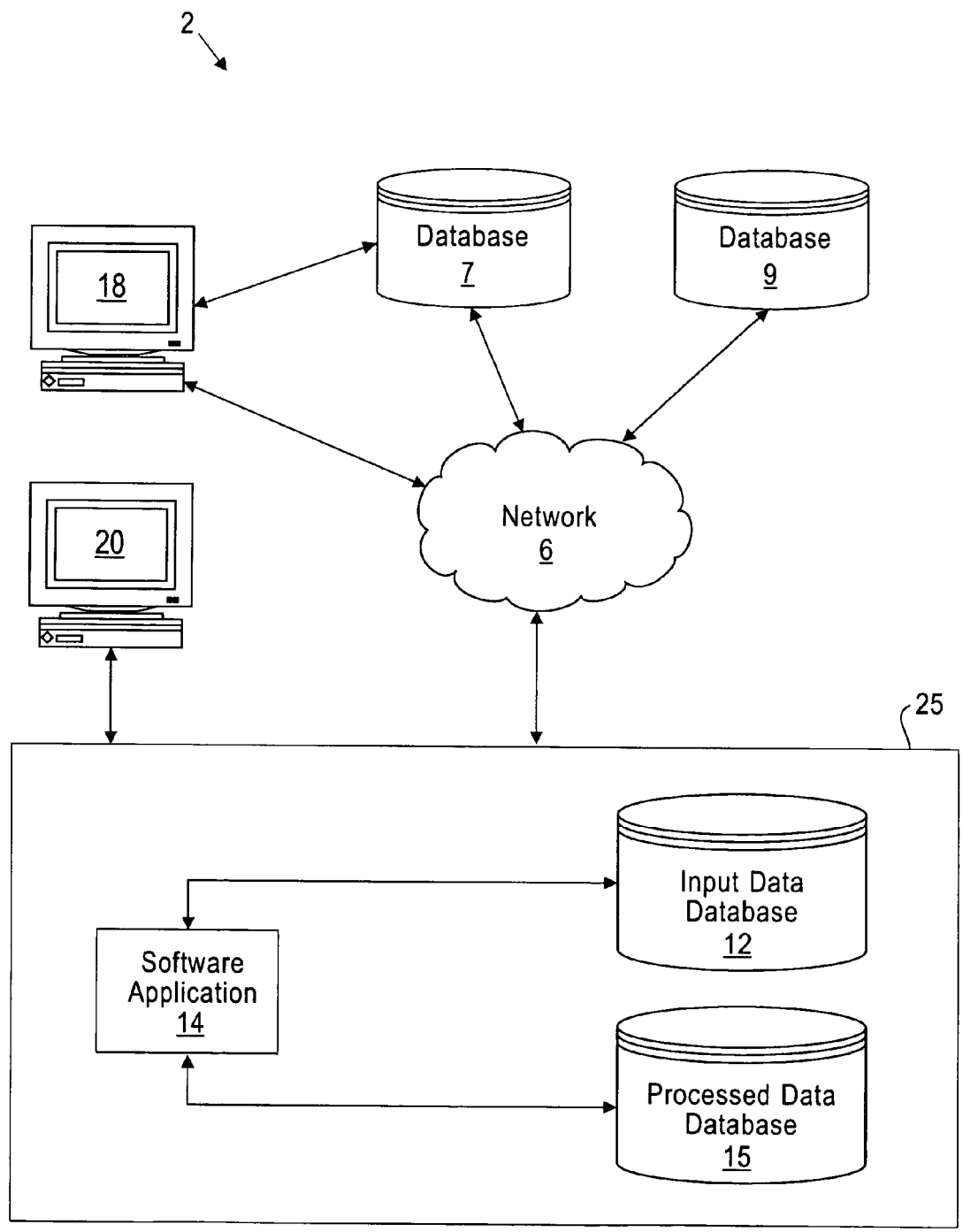
FIG. 1 illustrates a block diagram view of a system for selecting a list of URLs related to a subset or sub-domain of the world wide web for a specified domain of knowledge on the world wide web, in accordance with embodiments of the present invention.

FIG. 1 illustrates a block diagram view of a system 2 for selecting a list of URLs related to a subset or sub-domain of the world wide web for a specified domain of knowledge on the world wide web, in accordance with embodiments of the present invention. The world wide web (herein referred to as "the web") is an information sharing model comprising a method for accessing information over the Internet. A specified domain of knowledge on the web comprises a narrow portion of knowledge for a specific portion of interest related to information on the web (e.g., "automobiles" may be a specified domain). A sub domain comprises portion of the specified domain (e.g., "domestic automobiles" may be a sub domain). System 2 allows a user (e.g., a domain expert) to select a subset (or sub domain) of relevant (i.e., to the domain) WebPages (i.e., documents on the web) that have been crawled and indexed by a web crawler. System 2 performs a process to narrow down an existing index of URLs for web pages (i.e., web crawler results). System 2 will allow the user to generate a subset index of URLs for the broad index of URLs generated by a web crawler.

System 2 comprises a computing system 25 connected to a network 6, terminals 18 and 20, and databases 7 and 9. The computer network 6 may comprise any type of computer network known to a person of ordinary skill in the art including, inter alia, the Internet. Computing system 25 comprises a software application 14, an input data database 12, and a processed data database 15. Software application 14 performs an iterative process to generate a subset (i.e., sub-index comprising URLs for web pages ) of knowledge on the web for a specified domain. A user (e.g., a domain expert) may input (e.g., using terminal 18 or 20) an existing taxonomy of data (i.e., related to the specified domain) from database 7 and/or 9 into database 12 of computing system 25 or from the user's general knowledge. A taxonomy of data is defined herein as a classification or organization of data. The taxonomy of data comprises general knowledge belonging to the user of system 2 (e.g., a domain expert). Software application 14 uses as an input, the taxonomy of data to construct a taxonomy tree. A taxonomy tree is a hierarchical structure of data and is a tree of classifications for a given set of subjects. At the top of this hierarchical structure (i.e., the taxonomy tree) is a single classification (i.e., a root node) that applies to all objects (i.e., subject in the tree). Any nodes below the root node comprise more specific classifications (or subjects) that apply to subsets of the total set of classified objects. In order to narrow down an index comprising URLs (i.e., web crawler results) for web pages for a specified domain, the user selects a sub domain (i.e., a sub tree) from the specified domain (i.e., the taxonomy tree). For example, if the taxonomy tree is related to the domain of "Automobiles", the user may wish to select a sub domain of "Domestic Automobiles" to limit a search through the existing index of URLs to only WebPages comprising information related to domestic automobiles. Additionally, the user will input into database 12 of computing system 25, a first list comprising expected URLs that describe the selected sub domain. For example, the first list of expected URLs for the sub domain "Domestic Automobiles" could comprise the URLs: ford.com, chevrolet.com, and lincoln.com (the aforementioned URLs have been listed without the prefix www) because the aforementioned URLs would be expected to link to web pages comprising information related to the sub domain of "Domestic Automobiles". The first list of expected URLs may be determined from any source (e.g., from a published list, on an Internet site, from a database, from an expert's knowledge, etc).

Software application 14 applies Boolean operations or other types of qualifiers on the taxonomy tree to generate a second list comprising topic expressions (e.g., terms, phrases, etc). A topic expression comprises expression defining each node of the constructed taxonomy tree in database 12. The second list of topic expressions may include expressions defining all leaf nodes and all internal nodes for a portion (i.e., a sub domain) of the taxonomy tree that the user is interested in. The Boolean operators or qualifiers may be inputted into computing system 25 using terminals 18 and/or 20 and stored in database 12. Boolean operations that may be performed are on the taxonomy tree may comprise AND operations, OR operations, NOT operations, etc. The aforementioned operations may also encapsulate each other to form more complex operations. For example, an AND operation may be combined with an OR operation to include an expression defining a first node and a second node or an expression defining a first node and a third node. Given the second list of topic expressions generated from the taxonomy tree, the user also has the flexibility to manually add/remove topic expressions from the second list. The topic expressions are added/removed by the use of additional Boolean operators. Based on the aforementioned example, the use may change the topic expression "Domestic" as follows: "Domestic AND (car OR automobile OR vehicle)" to limit the topic expression "Domestic" to appear with cars.

Given the second list of topic expressions, a query is generated by applying Boolean operators to each of topic expressions. The query may comprise a WebFountain Query Language (WFQL). The query is applied to an existing index of URLs for web pages (i.e., web crawler results). The query generates a third list comprising a subset of relevant (i.e., to the user) URLs for WebPages from the existing index of URLs (i.e., web crawler results). Next, the software application 14 determines a first group (A) of URLs that are common to the third list and the first list and a second group (B) of URLs comprised by only the first list (i.e., not on the third list). $N_A$ represents a number of URLs in the first group. $N_B$ represents a number of URLs in the second group. A recall value R is denotes a percentage of URLs on the first list that appear on the third list and is determined by the following formula:

$$R=N_A/N_B*100\%$$

Computing system 25 performs a random sampling process of the third list that results in the generation of a sampled list (D) of URLs. The random sampling process may randomly select a predetermined percentage of URLs on the third list. The random sampling process may be performed by any random sampling process including, inter alia, a uniform distribution random sampling process, a weighted distribution random sampling process, etc. The sampled list (D) is sent to the user. The user evaluates the sampled list (D) and returns a sub-list (C) of URLs from the sampled list (D). The sublist (C) comprises URLs from the sampled list (D) that the user selects based on a selection criteria. Any criteria may be used to select the URLs for the sub-list (C). For example, the URLs may be selected based on information found on a published list, on an Internet site, in a database, from an expert's knowledge, etc). $N_C$ represents a number of URLs on the sub-list (C). $N_D$ represents a number of URLs on the sampled list (D). A precision value P denotes a percentage of URLs on the sub-list with respect to URLs on the sampled list (D) and is determined by the following formula:

$$P = N_C/N_D * 100\%$$

The process may repeat iteratively until both precision and recall values are acceptable to the user. The user may, inter alia, predetermine acceptable precision and recall values, locate acceptable precision and recall values from a database, Internet site, list, etc. The precision values and the recall values are stored in the database 15.

The following example illustrates an implementation of computing system 25 to select a list of URLs related to sub-domain from a specified domain of knowledge on the world wide web.

EXAMPLE

In the example the domain "Automobiles" and the sub domain "Domestic Automobiles" is selected. Therefore, a user (e.g., a domain expert) uses computing system 25 to select a sub-index of URLs for web pages from an existing index of URLs for web pages (i.e., web crawler results). System 2 will allow the user to generate a subset index of URLs for the broad index of URLs generated by a web crawler. Note that all URLs listed in the example are listed without the prefix www.

The following taxonomy related to "Automobiles" is inputted by the user into computing system 25. The taxonomy comprises general knowledge belonging to the user of system 2 (e.g., a domain expert). Alternatively, the taxonomy may be determined from any source (e.g., from a published list, on an Internet site, from a database, from an expert's knowledge, etc)

---

Taxonomy

Automobile
|-- Domestic
   |-- Ford
      |-- Crown Victoria
      |-- Five Hundred
      |-- Focus
         |-- Focus S
         |-- Focus SE
         |-- Focus SES
         |-- Focus ST
      |-- Fusion
      |-- Taurus
         |-- Taurus SE
         |-- Taurus SEL
   |-- Chevrolet
      |-- Aveo
      |-- Cavalier
      |-- Cobalt
      |-- Impala
      |-- Malibu
         |-- Malibu Sedan
         |-- Malibu LS sedan
         |-- Malibu LT sedan
   |-- Lincoln
      |-- Lincoln LS
      |-- Town car
         |-- Town car Signature Limited
         |-- Town car Signature L
      |-- Zephyr

---

The user inputs into system 25, a first list comprising expected URLs related to the selected sub domain of Domestic Automobiles. The first list may be determined from any source (e.g., from a published list, on an Internet site, from a database, from an expert's knowledge, etc).

First List
ford.com
chevrolet.com
lincoln.com
kbb.com

Boolean operations are applied to the taxonomy to generate a second list comprising topic expressions (e.g., terms, phrases, etc) as follows:

Second List
   Domestic
   OR Ford
   OR "Crown Victoria"
   OR "Five Hundred"
   OR Focus
   OR "Focus S" OR "Focus SE" OR "Focus SES" OR "Focus ST"
   OR Fusion
   OR Taurus
   OR "Taurus SE" OR "Taurus SEL"
   OR Chevrolet
   OR Aveo
   OR Cavalier
   OR Cobalt
   OR Impala
   OR "Malibu sedan" OR "Malibu LS sedan" OR "Malibu LT sedan"
   OR Lincoln
   OR "Lincoln LS"
   OR "Town car"
   OR "Town car signature Limited" OR "Town car signature L"
   OR Zephyr Given the second list of topic expressions generated from the taxonomy tree, the user also has the flexibility to manually add/remove topic expressions from the second list to generate a modified second list. The topic expressions may be added/removed by the use of additional Boolean operators. In the modified second list below the user has changed the topic term "Domestic" to "Domestic AND (car OR automobile OR vehicle)" to limit the term Domestic to appear with the term cars.

Modified Second List
   Domestic AND (car OR automobile OR vehicle)
   OR Ford
   OR "Crown Victoria"
   OR "Five Hundred"
   OR Focus
   OR "Focus S" OR "Focus SE" OR "Focus SES" OR "Focus ST"
   OR Fusion
   OR Taurus
   OR "Taurus SE" OR "Taurus SEL"
   OR Chevrolet
   OR Aveo
   OR Cavalier
   OR Cobalt
   OR Impala
   OR "Malibu sedan" OR "Malibu LS sedan" OR "Malibu LT sedan"
   OR Lincoln
   OR "Lincoln LS"
   OR "Town car"
   OR "Town car signature Limited" OR "Town car signature L"
   OR Zephyr Given the second list of topic expressions, a query is generated by applying Boolean operators to topic expressions. The following query is a WebFountain Query Language (WFQL). Query

```
<WFQL>
    <OR>
        <AND>
            <TERM>
                <ARGS><KEY>UTF8TOKEN</KEY><VAL>domestic</VAL>
                </ARGS>
            </TERM>
            <OR>
                <TERM>
                    <ARGS><KEY>UTF8TOKEN</KEY><VAL>car</VAL>
                    </ARGS>
                </TERM>
                <TERM>
                    <ARGS><KEY>UTF8TOKEN</KEY><VAL>automobile</VAL>
                    </ARGS>
                </TERM>
                <TERM>
                    <ARGS><KEY>UTF8TOKEN</KEY><VAL>vehicle</VAL>
                    </ARGS>
                <TERM>
            </OR>
        </AND>
        <TERM>
            <ARGS><KEY>UTF8TOKEN</KEY><VAL>ford</VAL>
            </ARGS>
        <TERM>
        <PHRASE>
            <TERM PHRASEPOS="0">
                <ARGS><KEY>UTF8TOKEN</KEY><VAL>crown</VAL>
                </ARGS>
            </TERM>
            <TERM PHRASEPOS="1">
                <ARGS><KEY>UTF8TOKEN</KEY><VAL>victoria</VAL>
                </ARGS>
            </TERM>
        </PHRASE>
        <PHRASE>
            <TERM PHRASEPOS="0">
                <ARGS><KEY>UTF8TOKEN</KEY><VAL>five</VAL>
                </ARGS>
            </TERM>
            <TERM PHRASEPOS="1">
                <ARGS><KEY>UTF8TOKEN</KEY><VAL>hundred</VAL>
                </ARGS>
            </TERM>
        </PHRASE>
        <TERM>
            <ARGS><KEY>UTF8TOKEN</KEY><VAL>focus</VAL>
            </ARGS>
        </TERM>
        ... ...
    </OR>
</WFQL>
```

The query is applied to an existing index of URLs for web pages (i.e., web crawler results) and a third list of URLs is generated.

Third list ford.com/
...
fordvehicles.com/
...
fordvehicles.com/cars/crownvictoria/
...
fordvehicles.com/suvs/escape/
...

-continued

Third list fordvehicles.com/trucks/ranger/
...
crownvictoriasafetyalert.com/
...
clubs.hemmings.com/frameset.cfm?club=crownvictoria
...
www.fordfound.org/
....
www.ford.co.uk/
...
www.hfmgv.org/
...

-continued

Third list fordracing.com/
...
henryford.com/
...
gm.com/
...
chevrolet.com/
...
chevrolet.com/express/
...
chevrolettheater.com/
...
lincoln.com/
...
whitehouse.gov/history/presidents/al16.html
...
lincoln.edu/
...
lincolnelectric.com/
...
www.lincoln.ac.nz/
...
lincoln.gov.uk/
...

Computing system 25 performs a random sampling process (e.g., a uniform distribution random sampling process, a weighted distribution random sampling process, etc) of the third list that results in the generation of a sampled list (D) of URLs for the user to evaluate.

Sampled list (D)

ford.com/
fordfound.org/
henryford.com/
chevrolet.com/
fordvehicles.com/trucks/ranger/
lincoln.com/
whitehouse.gov/history/presidents/al16.html
gm.com/
www.lincoln.gov.uk/

The user evaluates the sampled list (D) and returns a sub-list (C) of URLs from the sampled list (D). The sublist (C) comprises URLs that determined by a selection criteria. The selection criteria may comprise any criteria based on information from any source (e.g., from a published list, on an Internet site, from a database, from an expert's knowledge, etc). Sublist (C)
ford.com/
chevrolet.com/
lincoln.com/
gm.com/
fordvehicles.com/trucks/ranger/

The sublist (C) comprises URLs that link to web pages comprising information that is valuable and related to the sub domain. Nc represents a number of URLs on the sub-list (C). $N_D$ represents a number of URLs on the sampled list (D). A precision value P is determined by the following formula:

$$P=N_C/N_D*100\%$$

Therefore a precision value (P) is calculated as follows:

$$P=5/9*100\%$$

$$P=56\%$$

The software application 14 determines a first group (A) of URLs that are common to the third list and the first list and a second group (B) of URLs comprised by only the first list (i.e., not on the third list). $N_A$ represents a number of URLs in the first group. $N_B$ represents a number of URLs in the second group. A recall value (R) is determined by the following formula:

$$R=N_A/N_B*100\%$$

For the given four expected URLs on the first list, ford.com, chevrolet.com, and lincoln.com are common to the first list and the third list. All four URLs are on the first list so therefore the recall value (R) is calculated as follows:

$$R=\frac{3}{4}*100\%$$

$$R=75\%$$

If the precision and recall are satisfactory to the user, then the query is good and saved for future runs. If not, then the process repeats back from "Add and delete expressions" to further refine.

Figure 2:
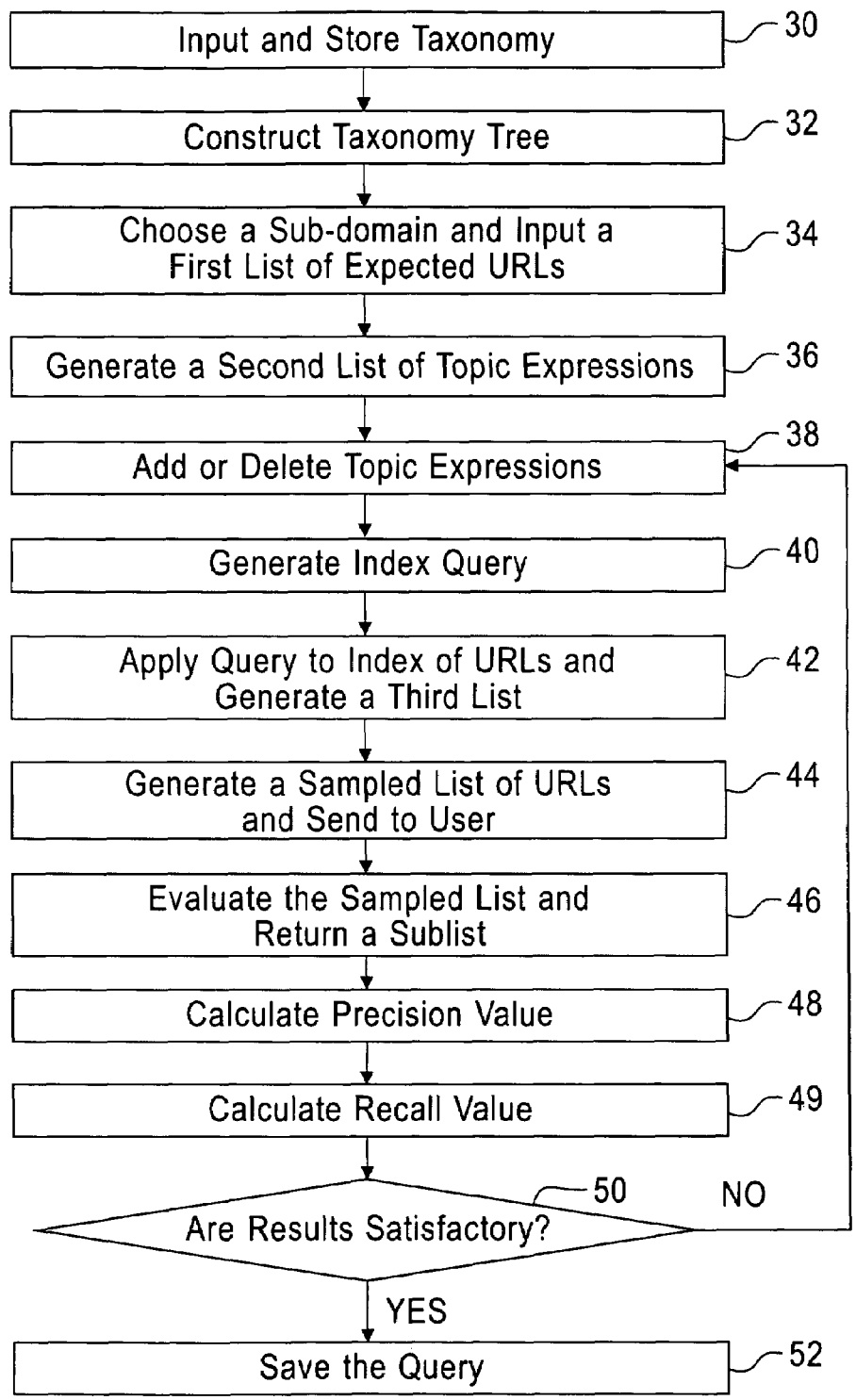
FIG. 2 is a flowchart describing an algorithm for implementing the system of FIG. 1, in accordance with embodiments of the present invention.

FIG. 2 is a flowchart describing an algorithm for implementing the system 2 of FIG. 1 for quantifying a subset of the world wide web for a specified domain of knowledge on the world wide web, in accordance with embodiments of the present invention. In step 30, a user inputs a taxonomy(i.e., related to a selected specified domain) into database 12 of computing system 25. The taxonomy may comprise an XML file. In step 32, software application 14 uses as an input, the taxonomy of data to construct a taxonomy tree. In step 34, the user selects a sub domain of the selected specified domain and inputs a first list comprising expected URLs related to the selected sub domain. For example, the first list of expected URLs for a sub domain "Domestic Automobiles" could comprise the URLs: ford.com, chevrolet.com, and lincoln.com (the aforementioned URLs have been listed without the prefix www) because the aforementioned URLs would be expected to link to web pages comprising information related to the sub domain of "Domestic Automobiles". The first list of expected URLs may come from a published list, an Internet site, a database, an expert's knowledge, etc. In step 36, software application 14 applies Boolean operations or other types of qualifiers on the taxonomy tree to generate a second list comprising topic expressions (e.g., terms, phrases, etc). In step 38, the user to manually adds/removes topic expressions from the second list. In step 40, a query is generated by applying Boolean operators to each of topic expressions on the second list. In step 42, the query is applied to an existing index of URLs for web pages (i.e., web crawler results). The query generates a third list comprising a subset of relevant (i.e., to the user) URLs for WebPages from the existing index of URLs (i.e., web crawler results). In step 44, computing system 25 performs a random sampling process of the third list that results in the generation of a sampled list of URLs. The sampled list of URLs is sent to the user for evaluation. In step 46, the user evaluates the sampled list and returns a sub-list of URLs from the sampled list. The sublist comprises URLs related to the sub domain (e.g., sublist URLs may come from a published list, an Internet site, a database, an expert's knowledge, etc). In step 48 a precision value is calculated based on the sampled list and the sublist. In step 49 a recall value is calculated based on the first list and the third list. In step 50, the user determines if the precision and recall values are satisfactory based on a comparison with predetermined precision and recall values. If in step 50, the user determines that the precision and recall values are not satisfactory then step 38 to step 50 are repeated for further evaluation. If in step 50, the user determines that the precision and recall values are satisfactory then step in step 52 the query is saved.

Figure 3:
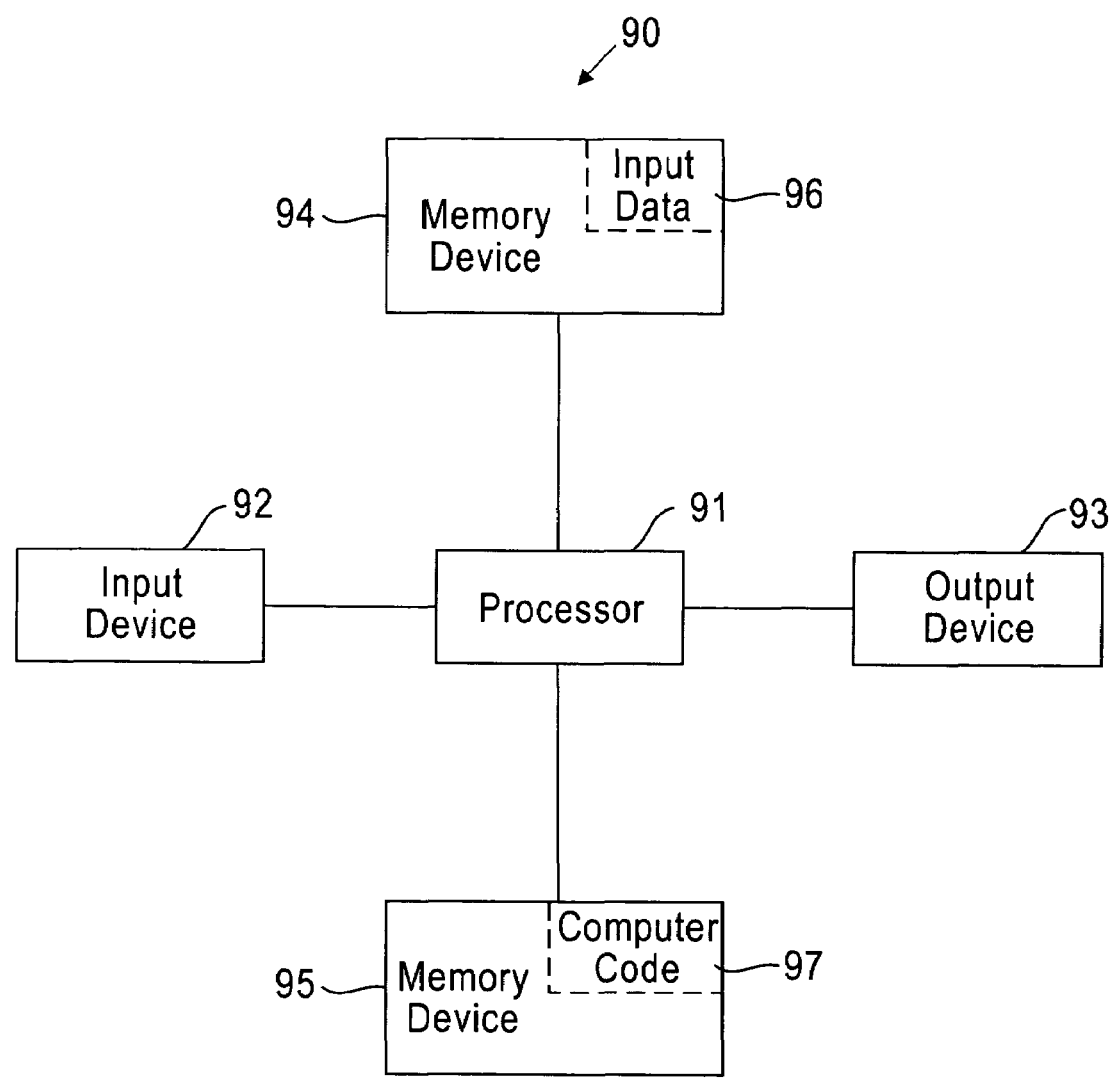
FIG. 3 illustrates a computer system for quantifying a subset of the world wide web for a specified domain of knowledge, in accordance with embodiments of the present invention.

FIG. 3 illustrates a computer system 90 (i.e., computing system 25 of FIG. 1) for selecting a list of URLs related to a subset or sub-domain of the world wide web for a specified domain of knowledge on the world wide web, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for selecting a list of URLs related to a subset or sub-domain of the world wide web for a specified domain of knowledge on the world wide web. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to select a list of URLs related to a subset or sub-domain of the world wide web for a specified domain of knowledge on the world wide web. Thus the present invention discloses a process for deploying or integrating computing infrastructure, comprising integrating computer-readable code into the computer system 90, wherein the code in combination with the computer system 90 is capable of performing a method for selecting a list of URLs related to a subset or sub-domain of the world wide web for a specified domain of knowledge on the world wide web. In another embodiment, the invention provides a business method that performs the process steps of the invention on a subscription, advertising, and/or fee basis. That is, a service provider could offer to quantify a subset of the world wide web for a specified domain of knowledge. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A selection method, comprising:
receiving, by a computing system, a taxonomy of data related to a specified domain of knowledge on the web;
storing, by said computing system, said taxonomy of data;
constructing, by a software application within said computing system, a taxonomy tree from said taxonomy;
receiving, by said computing system, a user selection for a taxonomy sub-tree from said taxonomy tree, said sub tree related to a sub-domain from said specified domain;
receiving, by said computing system from a user, a first list comprising user expected universal resource locators (URLs) related to said sub-domain, wherein said user selection is associated with a published list of URLs;
generating, by said software application, a second list comprising topic expressions defining each node of said taxonomy sub-tree;
receiving, by said software application, a first command for removing a first topic expression of said topic expressions from said second list;
removing, by said software application in response to said first command, said first topic expression from said second list;
receiving, by said software application, a second command for adding a second topic expression to said second list;
adding, by said software application in response to said second command, said second topic expression to said second list;
after said removing and said adding, generating by said software application, a query based on said second list by applying at least one Boolean operator on said topic expressions on said second list;
applying, by said software application, said query on an index of URLs, said index generated from a web crawling process;
generating, by said query, a third list comprising actual URLs located during said query;
determining, by said software application, a first group (A) of URLs that are listed on and common to said third list and said first list;
determining, by said software application, a second group (B) of URLs that are listed on only said first list;
calculating, by said software application, a recall value (R) based on a number of URLs in said first group ($N_A$) and a number of URLs in said second group ($N_B$), wherein $R=N_A/N_B$;
randomly sampling, by said software application, said third list to generate a sampled list (D) of URLs from said third list;
sending, said sampled list (D) to said user of said computing system;
receiving, by said computing system, a user selected sub-list (C) of URLs from said sampled list (D), said user selected sublist based on a selection criteria;
calculating, by said software application, a precision value (P) based on a number of URLs on said user selected sub-list ($N_C$) and a number of URLs on said sampled list ($N_D$) wherein $P=N_C/N_D$;

comparing, by said computing system, said recall value to a predetermined recall value;

determining, by said computing system based on first results of said comparing said recall value to said predetermined recall value, that said recall value comprises an acceptable recall value;

comparing, by said computing system, said precision value to a predetermined precision value;

determining, by said computing system based on second results of said comparing said precision value to said predetermined precision value, that said precision value comprises an acceptable precision value;

and saving, on said computing system in response to said first results and said second results, said sub-list (C).

2. The method of claim 1, wherein said taxonomy comprises XML code.

3. The method of claim 1, further comprising:

receiving, by said computing system, a fourth list comprising specified topic expressions; and adding, by said software application, said fourth list to said second list.

4. The method of claim 1, wherein said at least Boolean operator comprises a first Boolean operator encapsulated by a second Boolean operator, and wherein said first Boolean operator differs from said second Boolean operator.

5. A computing system comprising a processor coupled to a computer-readable memory unit, said memory unit comprising a software application and instructions that when executed by the processor implement a selection method, said method comprising:

receiving, by said computing system, a taxonomy of data related to a specified domain of knowledge on the web;

storing, by said computing system, said taxonomy of data;

constructing, by a software application within said computing system, a taxonomy tree from said taxonomy;

receiving, by said computing system, a user selection for a taxonomy sub-tree from said taxonomy tree, said sub tree related to a sub-domain from said specified domain;

receiving, by said computing system from a user, a first list comprising user expected universal resource locators (URLs) related to said sub-domain, wherein said user selection is associated with a published list of URLs;

generating, by said software application, a second list comprising topic expressions defining each node of said taxonomy sub-tree;

receiving, by said software application, a first command for removing a first topic expression of said topic expressions from said second list;

removing, by said software application in response to said first command, said first topic expression from said second list;

receiving, by said software application, a second command for adding a second topic expression to said second list;

adding, by said software application in response to said second command, said second topic expression to said second list;

after said removing and said adding, generating by said software application, a query based on said second list by applying at least one Boolean operator on said topic expressions on said second list;

applying, by said software application, said query on an index of URLs, said index generated from a web crawling process;

generating, by said query, a third list comprising actual URLs located during said query;

determining, by said software application, a first group (A) of URLs that are listed on and common to said third list and said first list;

determining, by said software application, a second group (B) of URLs that are listed on only said first list;

calculating, by said software application, a recall value (R) based on a number of URLs in said first group ($N_A$) and a number of URLs in said second group ($N_B$), wherein $R=N_A/N_B$;

randomly sampling, by said software application, said third list to generate a sampled list (D) of URLs from said third list;

sending, said sampled list (D) to said user of said computing system;

receiving, by said computing system, a user selected sub-list (C) of URLs from said sampled list (D), said user selected sublist based on a selection criteria;

calculating, by said software application, a precision value (P) based on a number of URLs on said user selected sub-list ($N_C$) and a number of URLs on said sampled list ($N_D$) wherein $P=N_C/N_D$;

comparing, by said computing system, said recall value to a predetermined recall value;

determining, by said computing system based on first results of said comparing said recall value to said predetermined recall value, that said recall value comprises an acceptable recall value;

comparing, by said computing system, said precision value to a predetermined precision value;

determining, by said computing system based on second results of said comparing said precision value to said predetermined precision value, that said precision value comprises an acceptable precision value;

and saving, on said computing system in response to said first results and said second results, said sub-list (C).

6. The computing system of claim 5 wherein said taxonomy comprises XML code.

7. The computing system of claim 5 wherein said method further comprises:

receiving, by said computing system, a fourth list comprising specified topic expressions; and adding, by said software application, said fourth list to said first list.

8. A computer program product, comprising a computer usable medium including a software application and computer readable program code embodied therein, said computer readable program code comprising an algorithm adapted to implement a selection method within a computing system, said method comprising:

receiving, by said computing system, a taxonomy of data related to a specified domain of knowledge on the web;

storing, by said computing system, said taxonomy of data;

constructing, by a software application within said computing system, a taxonomy tree from said taxonomy;

receiving, by said computing system, a user selection for a taxonomy sub-tree from said taxonomy tree, said sub tree related to a sub-domain from said specified domain;

receiving, by said computing system from a user, a first list comprising user expected universal resource locators (URLs) related to said sub-domain, wherein said user selection is associated with a published list of URLs;

generating, by said software application, a second list comprising topic expressions defining each node of said taxonomy sub-tree;

receiving, by said software application, a first command for removing a first topic expression of said topic expressions from said second list;

removing, by said software application in response to said first command, said first topic expression from said second list;

receiving, by said software application, a second command for adding a second topic expression to said second list;

adding, by said software application in response to said second command, said second topic expression to said second list;

after said removing and said adding, generating by said software application, a query based on said second list by applying at least one Boolean operator on said topic expressions on said second list;

applying, by said software application, said query on an index of URLs, said index generated from a web crawling process;

generating, by said query, a third list comprising actual URLs located during said query;

determining, by said software application, a first group (A) of URLs that are listed on and common to said third list and said first list;

determining, by said software application, a second group (B) of URLs that are listed on only said first list;

calculating, by said software application, a recall value (R) based on a number of URLs in said first group ($N_A$) and a number of URLs in said second group ($N_B$), wherein $R=N_A/N_B$;

randomly sampling, by said software application, said third list to generate a sampled list (D) of URLs from said third list;

sending, said sampled list (D) to said user of said computing system;

receiving, by said computing system, a user selected sub-list (C) of URLs from said sampled list (D), said user selected sublist based on a selection criteria;

calculating, by said software application, a precision value (P) based on a number of URLs on said user selected sub-list ($N_C$) and a number of URLs on said sampled list ($N_D$) wherein $P=N_C/N_D$;

comparing, by said computing system, said recall value to a predetermined recall value;

determining, by said computing system based on first results of said comparing said recall value to said predetermined recall value, that said recall value comprises an acceptable recall value;

comparing, by said computing system, said precision value to a predetermined precision value;

determining, by said computing system based on second results of said comparing said precision value to said predetermined precision value, that said precision value comprises an acceptable precision value;

and saving, on said computing system in response to said first results and said second results, said sub-list (C).

9. The computer program product of claim 8, wherein said method further comprises:

receiving, by said computing system, a fourth list comprising specified topic expressions; and adding, by said software application, said fourth list to said first list.

* * * * *